United States Patent [19]

Fudge

[11] Patent Number: 4,692,471

[45] Date of Patent: Sep. 8, 1987

[54] EXPANDABLE POLYPROPYLENE INTERPOLYMER PARTICLES

[75] Inventor: Kent D. Fudge, Glen Mills, Pa.

[73] Assignee: Atlantic Richfield Company, Los Angeles, Calif.

[21] Appl. No.: 947,339

[22] Filed: Dec. 29, 1986

Related U.S. Application Data

[62] Division of Ser. No. 851,391, Aug. 11, 1986.

[51] Int. Cl.$^4$ ................................................. C08J 9/18
[52] U.S. Cl. ........................................ 521/59; 521/56; 521/60; 521/139
[58] Field of Search ....................... 521/56, 59, 60, 139

[56] References Cited

U.S. PATENT DOCUMENTS

| | | | |
|---|---|---|---|
| 3,144,436 | 8/1964 | Greene et al. | 525/387 |
| 3,743,611 | 7/1973 | Muroi et al. | 521/60 |
| 3,959,189 | 5/1976 | Kitamori | 521/60 |
| 4,168,353 | 9/1979 | Kitamori | 521/60 |
| 4,303,756 | 12/1981 | Kajimura et al. | 521/60 |
| 4,303,757 | 12/1981 | Kajimura et al. | 521/60 |
| 4,429,059 | 1/1984 | Ozutsumi et al. | 521/60 |
| 4,622,347 | 11/1986 | Fudge | 521/60 |

*Primary Examiner*—Morton Foelak
*Attorney, Agent, or Firm*—Lewis J. Young

[57] ABSTRACT

Blends of polypropylene-poly(vinyl aromatic monomer) interpolymer with certain polymers and/or rubbers can be impregnated with blowing agents to give products which can be expanded under atmospheric steam conditions to give low density, fine cell structure foam particles.

6 Claims, No Drawings

EXPANDABLE POLYPROPYLENE INTERPOLYMER PARTICLES

This is a division of application Ser. No. 851,391 filed Aug. 11, 1986.

BACKGROUND OF THE INVENTION

The field of the present invention is the production of expandable thermoplastic resin particles which can be expanded under low temperature conditions to form fine cell structure foams of density lower than 2.0 pcf.

Polypropylene particles tend to lose blowing agent rapidly after impregnation. U.S. Pat. No. 4,303,756 describes a process for producing polypropylene-poly(-vinyl aromatic monomer) interpolymers which can be impregnated and retain the blowing agent for sufficient time to allow expansion. However, these interpolymers cannot be foamed at temperatures of 100° C. normally used to foam thermoplastic resins. U.S. Pat. No. 3,144,436 teaches to viscbreak polypropylene polymers to lower molecular weight polymers by extruding the polymers with a peroxide in the absence of oxygen.

SUMMARY OF THE INVENTION

I have now found that certain interpolymers of polypropylene and poly(vinyl aromatic monomers), when blended with polymers selected from polyethylenes, EPDM rubbers, S/B block copolymers, ionomers, ethylene-vinyl acetate copolymers, ethylene-ethyl acrylate copolymers, ethylene-propylene rubbers, and Polyethylene/polystyrene interpolymers can be impregnated with a blowing agent to give a product which can be expanded under low temperature (100° C.) conditions to give low density, fine cell structure foam particles.

DETAILED DESCRIPTION OF THE INVENTION

The process of this invention comprises
(a) forming a mixture of
(1) 75-96% by weight of mixture of a polypropylene-poly (vinyl aromatic monomer) interpolymer made by polymerizing 40 to 80% by weight based on the interpolymer of a vinyl aromatic monomer in the presence of an aqueous suspension of a copolymer of propylene and sufficient olefin comonomer to give said copolymer a melting peak of less than 150° C., and
(2) 4-25% by weight of mixture of a polymer selected from the group consisting of polyethylene, ionomers, ethylene-vinyl acetate copolymer, ethylene-ethyl acrylate copolymer, chlorinated polyethylene, chloro-sulfonated polyethylene, ethylene-propylene-diene monomer rubber, ethylene-propylene rubber, styrene-butadiene block copolymers, and polyethylene-poly(vinyl aromatic monomer) interpolymer;
(b) blending said mixture with 0-5% by weight based on blend of a lubricant and cell control agent and 0.005 to 0.5% based on blend of a perioxide at a temperature of 175 to 185° C.;
(c) impregnating said blend with 3 to 20% by weight of blend of a blowing agent and 0-5% by weight of blend of solvent, to give expandable blend particles which can be expanded under atmospheric steam conditions to fine cell structure foams of density less than 2.0 pounds per cubic foot.

The preparation of the interpolymer may be carried out according to U.S. Pat. No. 4,303,756 which is hereby incorporated in its entirety into the present application.

Particles is used herein to designate beads, pellets, or comminuted pieces.

The propylene copolymer used as base for the interpolymer must contain sufficient olefin comonomers to give said copolymer a melting peak of less than 150° C., perferable less than 140° C.

The olefin comonomers in the propylene copolymer may be ethylene, 1-butene or mixtures thereof. The melting peak is measured by Differential Scanning Calorimeter (DSC) by ASTM method D3418-82 at a heating rate of 20° C./min.

The vinyl aromatic monomer used may be styrene, alpha-methylstyrene, nuclear-methylstyrene, p-tert-butyl-styrene, chlorostyrene, bromostyrene, and mixtures thereof.

The polymers useful for blending with the interpolymers are selected from the group consisting of polyethylenes, ionomers, ethylene-vinyl acetate copolymers, ethylene-ethyl acrylate copolymers, ethylene-propylene rubbers, chlorinated polyethylenes, chlorosulfonated polyethylenes, ethylene-propylene-diene monomer rubbers (EPDM), styrene-butadiene block copolymers, and polyethylene-poly (vinyl aromatic monomer) interpolymers. These polymers usually undergo crosslinking during the blending with the peroxides.

The polypropylene base resin must be viscbroken in order for low temperature expansion to be practical. The polypropylene base resin may be viscbroken prior to, during, or after interpolymer formation. Viscbreaking can also be accomplished while melt blending the interpolymer with other polymers. Often, the other polymers crosslink when exposed to an organic peroxide during melt mixing, which in the case of blends with the interpolymer leads to viscbreaking of the interpolymer simultaneously with the crosslinking of the other polymer. This effect is referred to as "dynamic curing", which results in a thermoplastic material which often retains desirable elastomeric properties such as reduced compression set, improved resilience, low creep, improved toughness and improved temperature resistance. Dynamic curing is particularly desirable when blending lower melting peak ethylene-vinyl acetate copolymers or ethylene-ethyl acrylate copolymers with polypropylene or polypropylene-polystyrene interpolymer in order to improve the temperature resistance during expansion and molding.

To help minimize orientation stress in the blended particles, an additive combination of lubricant and cell control agent is used in amounts up to 5% by weight. The lubricants may be various polymer additives, waxes, organic halogen flame retardant compounds, amides, amines and esters. Especially useful was ethylene bis-stearamide, alone or in conjunction with zinc stearate.

The peroxide blended with the polymers may be any of the compounds having a 10-hour 1/2 life of between 100° C. and 130° C., such as dicumyl peroxide (117° C.) or 1,3-bis($\alpha$-tert-butylperoxyisopropyl)benzene (116° C.).

The blending may be done on any intensive mixing device, such as a Brabender mixer, extruder, or a Bolling mixer. Temperatures of mixing are not critical, but usually vary between 175° and 185° C. The blends are then ground, extruded, and pelletized before impregnation.

Impregnation of the interpolymer blend is accomplished by suspending the interpolymer in water with the aid of a water-soluble suspending agent, such as polyvinyl alcohol, methocel or sodium dodecylbenzene sulfonate. Because the polypropylenes do not retain blowing agents well, the presence of polystyrene helps to retain the blowing agents. To ensure the retention of the blowing agents after impregnation, the polymer must be rapidly cooled. Use of inorganic phosphates as suspending agents requires acidification of the polymer and water washing. These take time and would encourage the escape of blowing agent.

The blowing agents suitable in the impregnation include aliphatic hydrocarbons such as butane, n-pentane, isopentane, n-hexane, and neopentane, cycloaliphatic hydrocarbons such as cyclopentane and halogenated hydrocarbons such as methyl chloride, ethyl chloride, methylene chloride, trichlorofluoromethane, dichlorodifluoromethane, etc. These blowing agents can be used alone or as mixtures of two or more thereof. The preferred amount of the blowing agent is in the range of 3 to 20% by weight based on the weight of the polypropylene-polyvinyl aromatic monomer interpolymer. If necessary, a solvent may be used, such as toluene or benzene.

The present invention is further illustrated in the following Examples in which all parts and percentages are by weight.

EXAMPLE 1

(a) Preparation of Polypropylene-polystyrene Interpolymer

To a 5.6 l. polymerization reactor, was added 2000g. water, 9g. magnesium pyrophosphate and 0.4g. of sodium dodecylbenzene sulfonate as suspending agents. Then 1000g of polypropylene copolymer particles containing 4.2% by weight of ethylene copolymerized therein, and having a M.F. value of 3.0 and a melt peak of 126° C., were suspended in the aqueous medium. To the stirred suspension was added dropwise a solution of 10g. of benzoyl peroxide and 1g. of tert-butyl perbenzoate in 1000g. of styrene monomer at a temperature of 85° C. The polymerization was carried out for 7 hours. After cooling, the reaction mixture was removed, acidified to remove suspending agents, and the polymer particles separated from the aqueous medium, washed with water and air dried. The polypropylene-polystyrene interpolymer thus recovered had a M.F. of 1.45 and a ratio of polypropylene to polystyrene of 46 to 54% by weight.

(b) Viscbreaking of Polypropylene-polystyrene Interpolymer

The interpolymer was strand extruded in an MPM 1½" extruder at 171° C. through 0.125" diameter die holes (drawdown was 64% of the die area) and slow cooled in air. The formulation contained 100 parts of interpolymer from (a), 2.0 parts of ethylene bis-stearamide, 0.2 parts of zinc stearate, and 0.1% of 1,3-bis(α-tert-butylperoxy-isopropyl)benzene (Vulcup R peroxide from Hercules, Inc.). The amount of viscbreaking as measured by the increase in M.F. (condition L) was 21.6

(c) Blending of Interpolymer with polyolefins

Various blends of the viscbroken polypropylene-polystyrene interpolymer from (b) with polyolefins were made by intensive mixing at 182° C. for 3 minutes in a Bolling mixer. The blends were then ground and extruded and pelletized on a 1½"MPM extruder at 171° C. through the 0.125" diameter hole die with slow air cool and low drawdown. The pre-viscbroken interpolymer from (b) was used to allow comparison of cured and uncured blends containing the same base resin.

(d) Impregnation of Polypropylene-polystyrene Interpolymer Blends

The samples of interpolymer blends from (c) were impregnated with isopentane by charging to a series of 12 oz. crown cap bottles, 100g. of interpolymer from (c), 100g water 12.5g. isopentane, 0.031g. ethylene bis-stearamide, 0.031g. sodium dodecylbenzene sulfonate and 2.5g. toluene. The bottles were capped and heated to 60° C. and held at that temperature for 7 hours. The bottles were then cooled by chilling on ice, opened and the particles separated from the aqueous medium, and washed in a centrifuge.

The particles were then expanded at 100° C. to the densities given in Table I and cut open for visual determination of cell structure.

TABLE I

| Sample No. and Formulation | Expansion time, sec. | Density, Fresh | Pcf Aged | Cell Structure |
|---|---|---|---|---|
| A. Base PPI* | 60 | 1.50 | 1.40 | Fine |
| B. Base PPI + 10% Kraton 1102** | 60 | 4.0 | 3.54 | Small-Large |
|  | 120 | 2.4 | 2.23 | Small-Large |
| C. Base PPI + 10% Kraton 1102 + | 75 | 2.6 | 2.4 | Med-Large |
|  | 90 | 2.6 | 2.5 | Med-Large |
| 0.05% Vulcup-R | 120 | 5.0 | 4.0 | Med-Large |
| D. Base PPI + 5% Nordel 2722*** | 60 | 2.15 | 2.15 | Med-Large |
|  | 90 | 1.52 | 1.75 | Med-Large |
| E. Base PPI + 5% Nordel 2722 + | 30 | 4.0 | 4.2 | Med-Large |
|  | 40 | 3.4 | 3.5 | Med-Large |
| 0.05% Vulcup-R | 50 | 2.4 | 1.9 | Med-Large |
| F. Base PPI + 5% Nordel 2744**** | 50 | 2.4 | 2.3 | Medium |
|  | 70 | 1.86 | 1.90 | Medium |
|  | 90 | 1.54 | 1.60 | Medium |
| G. Base PPI + 5% Nordel 2744 + | 55 | 1.65 | 1.75 | Med-Large |
|  | 60 | 1.92 | 2.0 | Med-Large |
| 0.05% Vulcup-R | 70 | 1.70 | 1.75 | Med-Large |

*Made in part (b)
**Kraton 1102 is a styrene-butadiene-styrene linear block copolymer of 30% styrene-70% butadiene sold by Shell Chemical Co.
***Nordel 2722 is an EPDM rubber made by E.I. duPont de Nemours, Inc.
****Nordel 2744 is an EPDM rubber made by E. I. duPont de Nemours, Inc.

All the examples had excellent 95–100% fusion. Samples C, E and G were dynamically cured with additional peroxide. Although viscbreaking prior to blending may be desirable, it is also possible, if the base PPI has not been previously viscbroken, that during the dynamic curing the viscbreaking of the polypropylene would occur simultaneously with the crosslinking of the rubber phases.

The expansion results shown the blends expand to a higher density and require more Rodman exposure time for expansion than the PPI base resin. One reason for this is that addition of the Kraton or Nordel rubber dilutes the PPI and reduces the styrene level below 50%. Another probable reason for the higher expanded density is the Kraton and Nordel rubber increase the melt viscosity as seen by the melt processing Brabender results and thus probably increase the modulus of the resin during expansion in 100° C. steam.

The cured blends with Nordel 2722 and 2744 seemed to be more temperature sensitive during expansion and had higher shrinkage during molding than the uncured blends.

These results indicate the samples could be molded at lower back pressure which would minimize any shrinkage. Although the physical properties were not evaluated for any of these samples adding Kraton 1102 or EPDM rubber appears to increase the foam stiffness and improve toughness (puncture resistance to fracture).

EXAMPLE II

The blends of this example were made using 40% polypropylene-60% polystyrene interpolymers (PPI) made by the general method of Example I(a) starting with polypropylene copolymers having the melting peak temperatures shown in the Table II. The polyethylenes blended were added as a 40% polyethylene-60% polystyrene interpolymer (PEI) made by the method of Example I(a) starting with an ethylene-vinyl acetate copolymer.

All formulations contained 2.0% ethylene-bis stearamide, 0.2% zinc stearate, and 0.1% of 1,3-bis(α-tert-butylperoxyisopropyl) benzene. All formulations were blended in a Bolling mixer at 182° C. for 3 minutes, ground, extruded and pelletized at 176° C. in a 1½"MPM extruder through 0.125" diameter holes with minimum drawdown and slow air cool.

The blended particles were impregnated with 12.5% isopentane and 2.5% toluene as in Example I(d) and then expanded under atmospheric steam conditions. Results are shown in Table II.

TABLE II

| Sample No. | Melt Peak of Base PPI, °C. | Additive | Expansion time, sec. | Density Fresh | Density Aged | Cell Structure |
|---|---|---|---|---|---|---|
| A | 126.3 | — | 60 | 1.40 | 1.33 | med-large |
|   |   |   | 70 | 1.25 | 1.14 | med-large |
| B | 126.3 | PEI (25) | 50 | 1.42 | 1.35 | fine |
|   |   |   | 60 | 1.67 | 1.42 | fine |
| C | 129.6 | — | 75 | 1.25 | 1.26 | x-large |
|   |   |   | 90 | 1.18 | 1.04 | x-large |
| D | 129.6 | PEI (10) | 50 | 1.42 | 1.39 | large-x-large |
|   |   |   | 60 | 1.17 | 1.10 | large-x-large |
| E | 129.6 | PEI (20) | 40 | 1.26 | 1.29 | fine-med |
|   |   |   | 50 | 1.10 | 1.00 | fine-large |
| F | 137 | — | 120 | 1.90 | 1.82 | med-x-large |
|   |   |   | 150 | 1.40 | 1.45 | large-x-large |
| G | 137 | PEI (10) | 75 | 1.70 | 1.63 | large-x-large |
|   |   |   | 90 | 1.27 | 1.16 | large-x-large |
| H | 137 | PEI (20) | 65 | 1.15 | 1.05 | med-large |
|   |   |   | 75 | 1.04 | 0.92 | med-large |

Samples C and F show that these higher melting peak base interpolymers are not expandable in convenient times under the atmospheric steam conditions. Additions of polyethylene lowers the time to practical values to allow commerical utilization of the blends.

It has been shown that the use of polyethylene as additive in place of the polyethylene-polystyrene interpolymer has no effect on the expansion results.

I claim:

1. An expandable composition comprising a blend of
   (1) 75-96% by weight of mixture of a polypropylene-poly(vinyl aromatic monomer) interpolymer made by polymerizing 40 to 80% by weight based on interpolymer of a vinyl aromatic monomer in the presence of an aqueous suspension of a copolymer of propylene and sufficient olefin comonomer to give said copolymer a melting peak of less than 150° C., and
   (2) 4-25% by weight of mixture of a polymer selected from the group consisting of polyethylene, ionomers, ethylene-vinyl acetate copolymers, ethylene-ethyl acrylate copolymers, chlorinated polyethylenes, chlorosulfonated polyethylenes, ethylene-propylene-diene monomer rubbers, ethylene-propylene rubbers, styrene-butadiene block copolymers, and polyethylene-poly(vinyl aromatic monomer) interpolymer;
   (3) 0-5% by weight of a lubricant and cell control agent; and said composition having been heated to 175° C. to 185° C. in order to viscbreak the interpolymer of (1), supra
   (4) 3-20% by weight of a blowing agent.

2. The composition of claim 1 wherein said olefin comonomer is selected from the group consisting of ethylene, butene-1, and mixtures thereof.

3. The composition of claim 1 wherein said vinyl aromatic monomer is at least one monomer selected from the group consisting of styrene, alpha-methylstyrene, nuclear-methylstyrene, p-tert-butylstyrene, chlorostyrene, bromostyrene, and mixtures thereof.

4. The composition of claim 1 wherein said lubricant and cell control agent is 2-4% by weight ethylene-bis-stearamide based on interpolymer.

5. The composition of claim 1 wherein said lubricant and cell control agent is 2-4% by weight ethylene-bis-stearamide and 0.2-0.4% by weight zinc stearate based on interpolymer.

6. The composition of claim 1 wherein said blowing agent is selected from the group consisting of aliphatic hydrocarbons, cycloaliphatic hydrocarbons, and halogenated hydrocarbons and said solvent is toluene.

* * * * *